United States Patent [19]

Wade et al.

[11] Patent Number: 4,918,857
[45] Date of Patent: Apr. 24, 1990

[54] PEST COLLECTION AND DISPOSAL DEVICE

[75] Inventors: Bill R. Wade; Thelma L. Wade, both of Farmington, Wash.

[73] Assignee: Bilou, Inc., Farmington, Wash.

[21] Appl. No.: 225,046

[22] Filed: Jul. 27, 1988

Related U.S. Application Data

[63] Continuation-in-part of Ser. No. 96,371, Sep. 11, 1987.

[51] Int. Cl.$^5$ ............................................. A01M 1/06
[52] U.S. Cl. .................................. 43/139; 15/415 R; 15/330; 15/344; 15/402; 43/140
[58] Field of Search ................ 43/132.1, 133, 136, 43/138, 139, 140; 15/330, 344, 402, 415, 342, 343, 344

[56] References Cited

U.S. PATENT DOCUMENTS

| | | | |
|---|---|---|---|
| 3,330,063 | 10/1965 | Lockwood | 43/139 |
| 3,739,421 | 6/1973 | Fukuba | 15/415 |
| 4,074,458 | 2/1978 | Catlett | 43/139 |
| 4,175,352 | 10/1979 | Catlet | 43/139 |
| 4,279,095 | 7/1981 | Aasen | 43/139 |
| 4,733,495 | 3/1988 | Winnicki | 43/139 |
| 4,780,986 | 10/1988 | Broomfield et al. | 43/139 |
| 4,794,725 | 1/1989 | Numerick | 43/139 |

Primary Examiner—Nicholas P. Godici
Assistant Examiner—Mike Starkweather
Attorney, Agent, or Firm—Oldham & Oldham Co.

[57] ABSTRACT

A pest collection-disposal device includes a means for establishing an air stream in an air duct forming at least a segment of a housing for the device. Positioned in the duct is a disposable pest collection cartridge. The cartridge comprises an elongated body having a flexible closure means and a filter means. The closure means deflects under the influence of an air stream from a closed position to provide an entrance thereto for insects entrained in the air stream. The filter means separates insects from the air stream. Upon termination of air flow, the flexible closure member is restored to an initial position to entrap the pest between the flap and filter means. The duct in one embodiment includes an expandable and retractable array of elongated telescoping members. In a further embodiment, the cartridge is positioned in one of the elongated duct members.

6 Claims, 4 Drawing Sheets

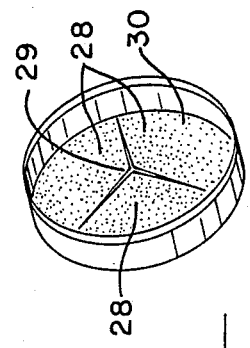
FIG.-4
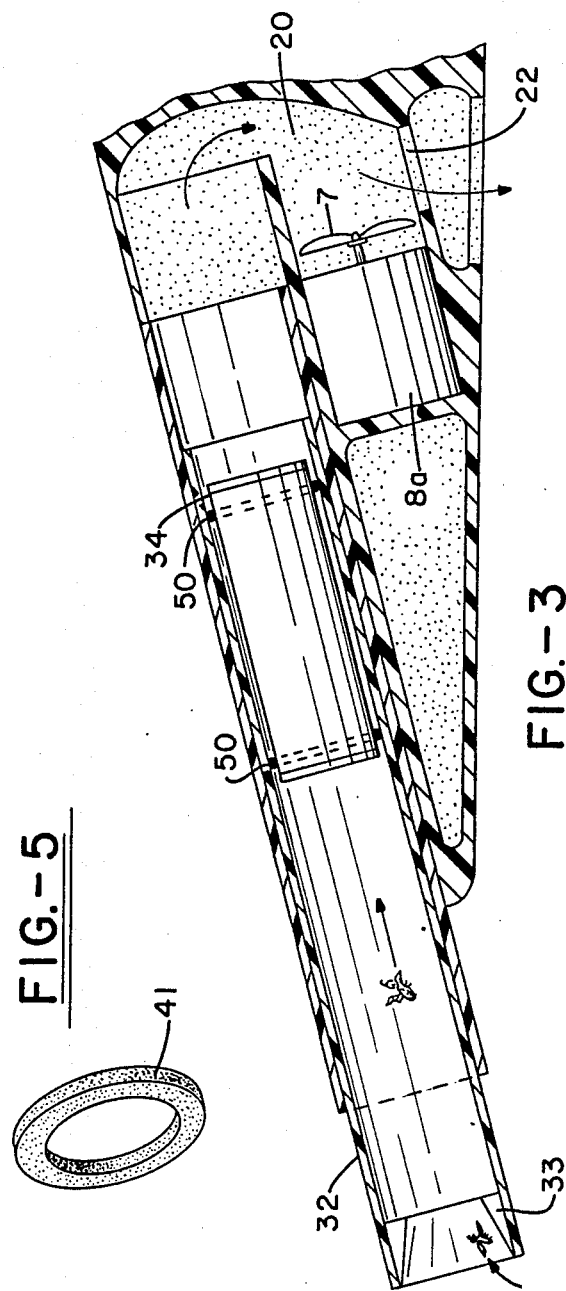
FIG.-5
FIG.-3
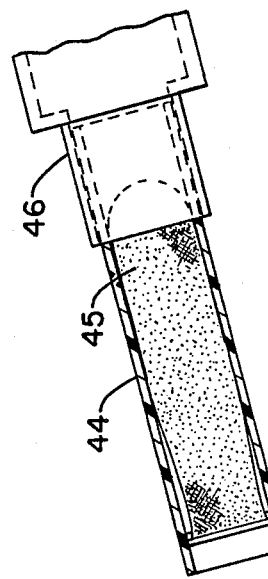
FIG.-6

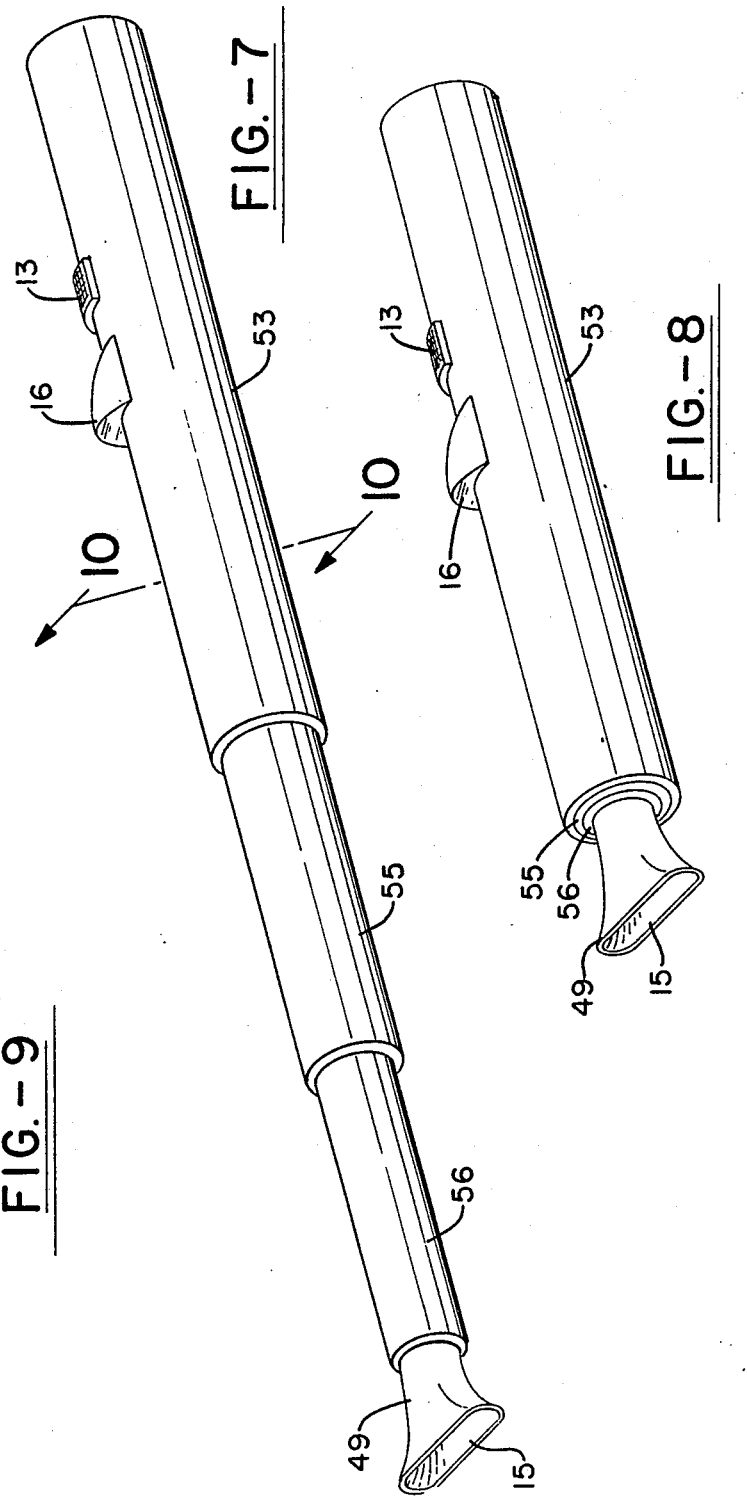

PEST COLLECTION AND DISPOSAL DEVICE

FIELD OF INVENTION

This is a continuation-in-part of Ser. No. 07/096371, filing date of Sept. 11, 1984. This invention relates to pest collection and disposal devices which provide for the collection of pests such as flies and other household insects from accessible and from relatively inaccessible locations and for the disposal of pests thus collected. More particularly this invention relates to a pest collection and disposal device having a disposable-replaceable cartridge positioned in a duct of the device and through which flows an air stream having pests entrained in the air stream.

BACKGROUND ART

Pest collecting devices are well known in the art. These include gum sticker strips as well as the portable, electric gun devices of U.S. Pat. Nos. 4,488,331; 4,674,458 or 4,607,457. Although these devices utilize a vacuum or suction accompanying an air stream generated by an electric fan, they do not provide for a disposable cartridge which has a builtin, insect retaining means and which closes automatically to entrap an insect. Other known insect trapping devices currently available and which have been available for a number of years are fly swatters, poison sprays and fly papers. However these techniques for capturing insects are generally disagreeable and unsightly.

OBJECTS AND SUMMARY OF THE INVENTION

Accordingly, it is an object of this invention to provide an improved device for the collection and disposal of pests.

Another object of this invention to provide a pest collecting device having a readily removeable and disposable cartridge positioned in a duct of the device.

Another object of the invention is to provide a disposable pest collecting cartridge having means for automatically establishing an entrance thereto under the influence of an air stream flowing therein and a filter means for removing pests entrained in the air stream.

A further object of the invention is to provide a pest collecting device having an adjustable length duct formed by an expandable and retractable array of elongated, hollow members.

Another object of the invention is to provide a device of the type described having an adjustable length duct formed by an array of elongated hollow members and a disposable cartridge positioned in one of said members.

Another object of the invention is to provide a device of the type described having an adjustable length duct formed by an array of elongated hollow members and wherein a disposable pest collecting cartridge for the device comprises a member of the array.

In accordance with features of this invention, a pest collecting device comprises a housing, an air duct formed in part by the housing and means positioned in the housing for establishing an air stream in the duct. A disposable-replaceable pest collecting cartridge is provided and is positioned in the duct. The cartridge includes a flexible closure member adjacent an inlet end thereof and a filter means adjacent an outlet end thereof. Upon establishment of an air stream in the duct, the closure member is automatically deflected by the air stream to provide an entrance to the cartridge whereby pests entrained in the air stream are carried into the cartridge and removed from the air stream by the filter means. Upon termination of the air stream, the closure member is restored to an initial closed position thereby entrapping the pest within the cartridge. In one embodiment, the cartridge is received in a housing cavity forming part of the duct. In another embodiment, the cartridge is positioned in an extending, elongated hollow member of the duct. In still another embodiment, the cartridge is itself formed by an elongated duct member.

In accordance with other features of the invention, the duct of the pest collecting and disposal device includes an expandable and retractable array of elongated hollow members which can be expanded in a telescoping manner to provide an elongated duct with distal inlet for capturing pests at relatively inaccessible locations. The array of members can be retracted in a telescoping manner to provide a relatively shortened duct for capturing pests at accessible locations and for storage.

A cartridge in accordance with the invention comprises an elongated hollow body having air flow inlet and outlet apertures at opposite ends thereof, a flexible closure member which deflects under the reduced pressure of an air stream flowing through the cartridge to provide an entrance to the member, and a filter member for removing from the air stream pests entrained in the air stream.

More particularly, the device of one embodiment includes a housing, the housing defining in part an air duct, a motor actuated fan positioned in the housing for establishing an air stream in the duct, an expandable and retractable array of elongated hollow duct members and wherein at least one of said hollow duct members has positioned therein a disposable hollow insect entrapping cartridge. Alternatively, a hollow duct member itself forms the body for a disposable cartridge. In one embodiment, a motor and fan are positioned in a hollow duct member which member is of relatively greater cross sectional configuration than a duct member in which the cartridge is positioned thereby providing efficiency and economy in power usage and permitting flow of the air stream in increased volume.

BRIEF DESCRIPTION OF THE DRAWINGS

These and other objects and feature of the invention will become apparent from the following specification and from the drawings, wherein:

FIG. 3 is a fragmentary view of the device of this invention illustrating an inlet to the duct of the device and an alternative cartridge positioning near the inlet opening.

FIG. 4 is an enlarged, perspective view of a cartridge closure member having a single member flap.

FIG. 5 is an enlarged, perspective view of an annular elastomeric gasket which is positioned at inlet and outlet ends of the cartridge receiving cavity of FIG. 1.

FIG. 6 is a fragmentary view in section of a telescoping duct member used with the device of this invention and having a conventional dust collecting disposable bag and adapted for receiving a conventional sweeper or vacuum cleaner attachment.

FIG. 7 is a perspective view of one embodiment of an expandable and retractable array of duct members of the insect collecting device of this invention and illustrating the array in an expanded position.

FIG. 8 is a perspective view of the device of FIG. 7 illustrating the array of duct members retracted for ease of storage or transit.

FIG. 9 is a perspective view of the device of FIG. 8 illustrating the device positioned in a storage rack having means for recharging batteries of the device from a power supply connected to the storage rack.

DETAILED DESCRIPTION

Figure 1:
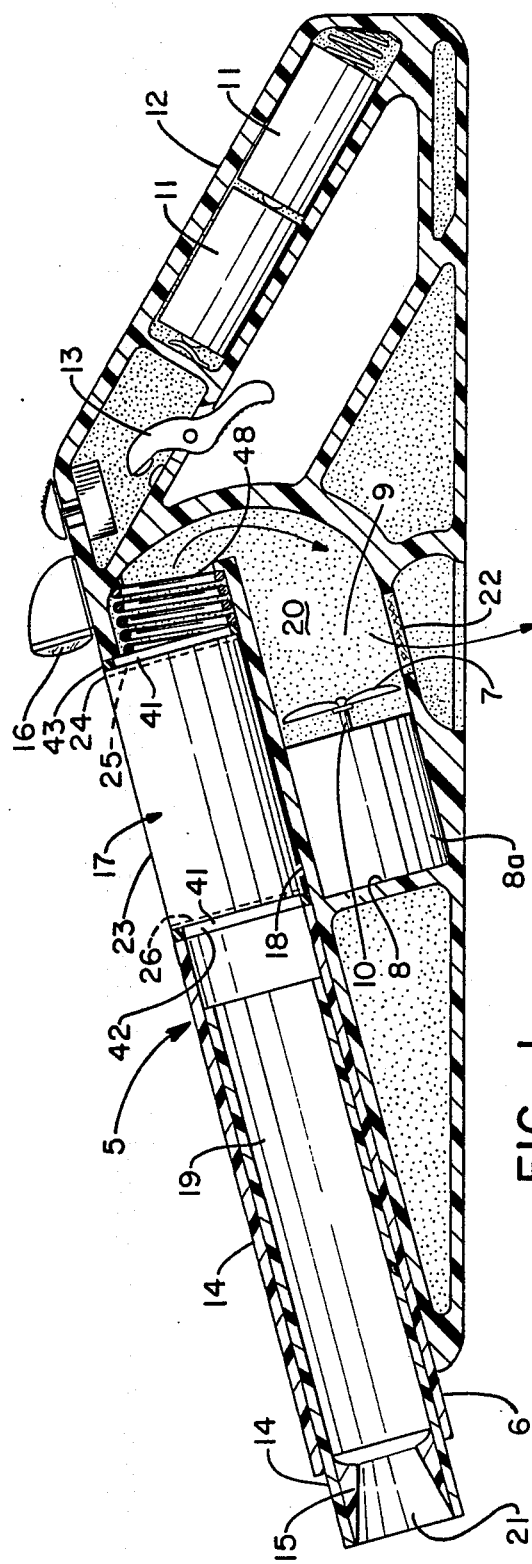
FIG. 1 is a cross-sectional view in elevation of one embodiment of the device of this invention illustrating a housing having a cavity therein for receiving a pest collecting cartridge in a central part of a duct for the device.

Referring now to the drawings wherein like numerals designate like elements, the device of the invention, indicated generally by reference numeral 5, comprises a housing having air flow passages extending therethrough and which include an integral elongated tubular air duct segment 6. A rotating fan 7 causes an air stream to flow in the air passages. Air enters an inlet to the duct 6, flows through the device in the direction as indicated by the arrows and is then exhausted from the housing.

The housing includes an integrally formed motor compartment 8 to receive and house an electric motor 8a, and, an integrally formed fan compartment 9 for receiving the fan 7 which is coupled to a drive shaft 10 of the motor. The fan compartment 9 forms part of the air flow passage. The motor 8a may be driven by an AC current supply but preferably is driven from a DC power source comprising batteries 11 which are shown positioned in an integral handle segment 12 of the housing. A trigger switch 13 is provided to control the application of electrical power from the batteries to the motor and to thereby initiate and terminate rotation of the fan 7. Switch 13 is electrically coupled to the batteries 11 and to the motor 8a for energization of the motor upon actuation of the switch. The D.C. batteries may be coupled to an AC power source through a well known battery charging means for maintaining the batteries in a charged state. A battery charger such as charger 47 of FIG. 9 may be associated with a storage rack 52 of FIG. 9, in which the device 5 is positioned and is stored while charging batteries and until ready to be used. Preferably the storage rack 52 is attached to a surface such as a wall by conventional means such as screws.

It is preferable that one or more elongated, hollow air duct members, shown to be tubes 14, are provided to form an extendable and retractable array which extends the length of duct and the air flow passage. These members are positioned in the air duct segment 6 for telescopic adjustment. Air flowing to the duct segment 6 enters an air inlet opening 21 of the tube 14 and flows through a constricting nozzle 15. This arrangement permits the air nozzle 15 to be spaced apart both from the noise of the motor and from the operator. It also facilitates placement of the nozzle at relatively remote and difficult to reach locations such as areas behind furniture or inside cabinets and to reach insects near ceilings. A lamp 16 is provided to illuminate areas and to aid in locating insects where lighting is dim.

A disposable, elongated tubular shaped insect collecting cartridge 17 is provided as illustrated in the embodiment of FIG. 1. Cartridge 17, which is adapted to enable air flow therethrough in the direction of its elongated longitudinal axis, is fitted into an integrally-formed cartridge holder cavity segment 18 of the housing. Upon actuation of the fan 7, an air stream is established and air is drawn into the inlet 21, flows through the constriction 15, through the tubular passage 19 of tubular duct member 14 which is positioned in duct member 6, through the cartridge 17, and through an air channel 20 of the fan compartment 9 from which it is exhausted through a housing air outlet 22.

In the embodiment shown in FIG. 1, there is positioned in the cartridge holder cavity segment 18 a pair of annular, elastomeric gaskets 41. One such gasket is shown enlarged in FIG. 5. A first of these gasket is located adjacent an inlet end 42 of the cavity and a second gasket is located adjacent an outlet end 43 to form an air tight seal between the cartridge 17 and the air duct 6. A spring 48 positioned adjacent gasket 41 at the outlet end 43 establishes an axial force sufficient to achieve flexible yet air tight contact with the cartridge in the air duct.

Upon rotation of the fan 7, an air stream flows which reduces the pressure and creates a suction in the air channel 20 and in the cartridge 17. This suction causes a closure member comprising a cartridge flap 26, described below, to flex inwardly from an initial closed position and to provide an entrance to the cartridge 17. An insect entrained in the air stream will be carried into the cartridge 17 by the surge of air of the stream. This surge of air helps capture the pest before escape flight can occur. An insect or pest becomes entrained in the air stream by positioning the inlet nozzle near the insect.

Figure 2:
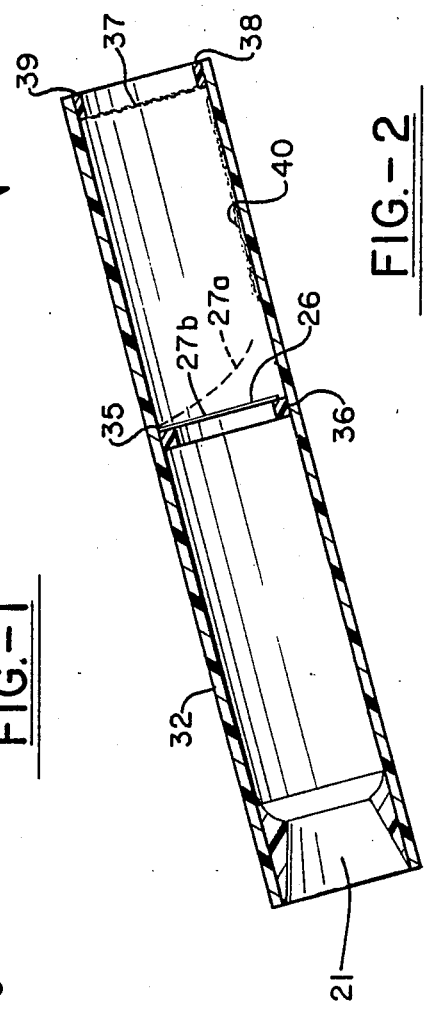
FIG. 2 is a cross-sectional view in elevation of a preferred embodiment of a cartridge formed in the interior of a telescoping, disposable duct member.

The cartridge 17 comprises an elongated hollow body 23 shown to be tubular shaped. It is preferably formed of a stiff plastic such as a polyethylene which is sized to fit into the cartridge holder cavity segment 18 of the housing. In an alternative embodiment the cartridge 17 is positioned in a duct member such as the telescoping duct member 32 as illustrated in FIG. 3 which includes an insect catching deflector 33 near an inlet. An air pervious filter means comprising a screen or porous fiber packing 25 is also provided for the cartridge. This filter means intercepts and filters from the air stream an insect entrained in the air stream while enabling the air stream to flow freely therethrough. The air suction causes a closure member flap 26 to deflect inwardly from an initial closed position and to enable an insect entrained in the air stream to be carried into the cartridge. An inner surface of the cartridge body is preferably coated with a pressure sensitive adhesive of one of a well known type used with the well known fly trap papers or other well known adhesives. The closure member flap 26 is preferably formed to fit snugly with the inner wall of the cartridge body. It may, as shown in FIG. 4, be mounted to a support body which support body is positioned with the flap within the cartridge body. The flap 26 in one embodiment has essentially the same configuration as the cross sectional configuration of the duct member and is anchored to the duct member, as shown in FIG. 2, by a ring shaped support body 35. The thin, flexible, flap body 26 flexes from an initial closed position inside the tube as shown by dashed line 27a to provide an entrance through which the insect is carried by the air stream. Flap 26 is automatically restored to its initial closed position 27b when the air stream terminates thereby entrapping the insect within the cartridge.

Another embodiment of the closure member flap configuration, as shown in FIG. 4, is trilobal having the shape of a heart valve. As the air stream flows, the closure member opens inwardly and the trilobal shaped flap segments 28 flex inwardly under the force of air stream suction. As the air stream suction terminates, the flap segments 28 are restored automatically to their initial position thus inhibiting escape of the insect from within the cartridge through the cartridge inlet. It is desirable that a flap such as the trilobal flap have a thickness in the range of about 2 to 20 mils and preferably in the range of 8 to 15 mils and the thickness from the tip 29 (FIG. 4) of the flap to its base portion 30 may vary in the range from about 1 to 5 mils or more to facilitate the flap opening and closing when the elastomer of the flap has a Shore A hardness of about 60 to 75. This thickness variation may be achieved by inclusion of an annular ring of elastomer near the base portion 30 of the flap but may preferably be formed by molding or die cutting from a sheet having the desired thickness variation also. For the relatively larger insects such as hornets, the harder Shore A plastics, i.e. those with a Shore A hardness in the range of about 70 to 85 are more desirable. It should be appreciated that the closure member flap may be made of various flexible polymer plastics and the thickness and Shore A hardness will vary, depending upon such factors as whether the flap is a unitary body or is segmented such as being trilobal or quadralobal, as well as the thickness and inherent flexible and hardness properties of the elastomer or polymer plastic.

Referring now to FIG. 3, the cartridge 17 is shown positioned in an outermost duct member comprising a telescoping tube 32. In this embodiment the cartridge 17 is shown positioned adjacent an outlet end 34 of tube 32. Cartridge 17 can be removed by initially removing tube 32 from the device and then removing the cartridge from outlet end 34 by applying a force which overrides friction forces established by gaskets 35. These preferably comprise a pair of spaced apart O-rings. The cartridge 17, at the time it is to be discarded, can be removed from the tube 32 by grasping it with a finger and pulling it from the tube. For facility in placement of the cartridge in the tube 32, the tube includes an inner annular recess, not shown, formed in its inner surface to seat and to retain the O-rings 33 in a desired location. In addition, it may be desirable to have deflectors 33 in the entry to the inlet of the tube to enhance the air flow or increase its velocity.

In the embodiment of FIGS. 2, 7 and 8 the cartridge is assembled inside the duct member of outer telescoping tube 32 by using the body of tube 32 itself as the component elongated body of the cartridge. The elastomer flap closure member 26 is positioned inside the tube and is spaced in the range of about 2 to 4 inches from the inlet aperture 21. It is anchored to the inner wall of tube 32 at an edge segment 35 thereof by an adhesive or by a flange 36 as shown in FIG. 2. A filter means, as for example a fine mesh screen 37 adapted for filtering insects to be captured from the air stream, is placed adjacent an outlet aperture 38 of the tube and is retained in the tube by annular flange 39. It is desirable to position a pressure adhesive 40 which contains an insectide, preferably of the class which is relatively non toxic to humans or pets, over at least part of the inside surface of the tube 32 between the screen 37 and the flap 26 for restraining entrapped insects. It is also desirable to space apart the adhesive coating from the point of maximum inward movement of the flap. Usually a spacing of about 1 or 2 inches is desirable. This construction provides a readily disposable-replaceable cartridge, yet enables pests to be collected and to be discarded without presenting an unsanitary and unsightly condition.

In the arrangement as shown in FIG. 6, the invention provides for a tube 44 having a dust collector 45 used with conventional sweeper/vacuum cleaner attachments 46. This dust collecting tube may be discarded and be replaced with a replacement dust collecting tube or in some cases, a bag or a tube containing the pest collecting cartridge. The arrangement of FIG. 6 thus permits the motor-fan device to be used alternatively as a pest collector or as a dust collector.

Referring now to the alternative embodiment of FIGS. 7, 8 and 9, an elongated, wand-shaped pest collecting and disposal device of the invention is shown to include an array of elongated duct members. The pest collector device is shown fully extended for catching insects in FIG. 7 and fully retracted for storage in FIGS. 8 and 9. FIG. 9 illustrates the device of FIG. 8 with retracted duct members stored in a storage rack 52 and having a pluggable battery charger 47 associated therewith for coupling to the batteries and for maintaining them in a charged state. The device is thus ready to be removed from the storage rack 52 for use.

Figures 10, 11, 12, 13:
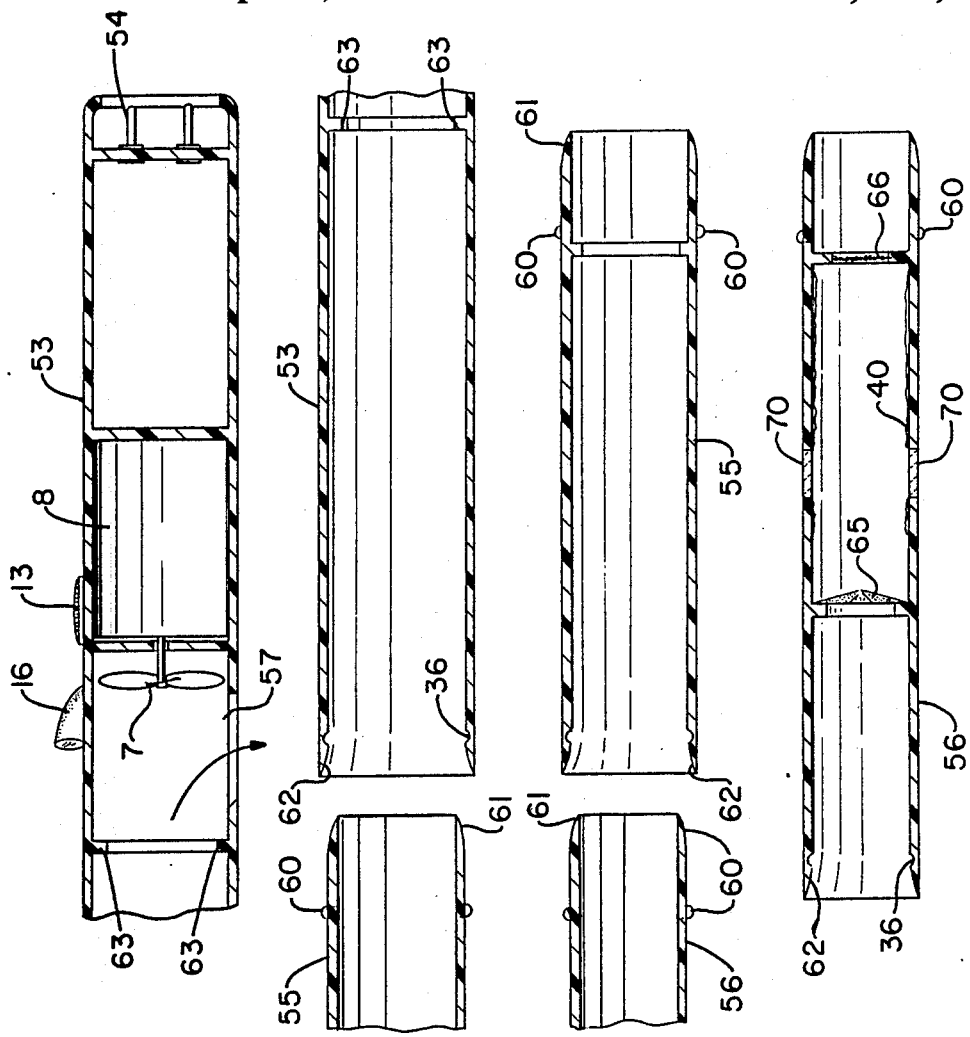
FIG. 10 is a cross-sectional view taken along line 10—10 of FIG. 7 illustrating the positional relationship between a motor, fan, battery storage area, battery recharge plug-in means and duct member leading to the cartridge.
FIG. 11 is an exploded, fragmentary, longitudinal, cross-sectional view of a storage member of the array of duct members and a duct member telescopically movable in said duct array to effect extension and retraction, respectively of the array shown in FIG. 7 and 8.
FIG. 12 is a fragmentary, exploded, side elevation view in section of an embodiment of the device of FIGS. 7 and 8 illustrating the interrelationship between the expansion duct member and a disposable cartridge duct member.
FIG. 13 is a cross-sectional view through a preferred embodiment of a disposable cartridge of this invention.

Referring now to FIG. 10, reference numeral 53 designates a first elongated duct member which houses a receptacle 54 for receiving a plug from the battery charger 47, a battery compartment 11, a compartment for motor 8 and a compartment for fan 7. Duct member 53 is mechanically coupled to a second elongated duct member 55 which is partly positioned within duct member 53 for sliding telescopic movement and engagement therewith. A third elongated duct member 56 is mechanically coupled to and partly positioned in duct member 55 for sliding telescopic engagement therewith. Duct member 56 preferably houses the disposable cartridge 17. Duct member 56 also has mounted to a distal end segment a nozzle 15. Alternatively, a sweeper attachment may be fitted thereto as is shown in FIG. 6.

Figure 16:
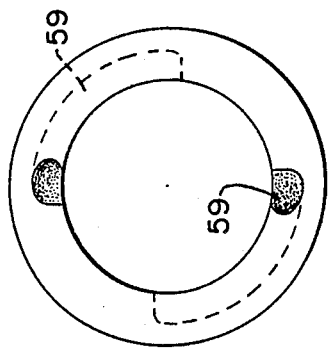
FIG. 16 is a cross-sectional view of a telescoping duct member illustrating a groove segment of the member for locking an inner duct member tube inside an outer duct member.

The arrangement of the first duct member 53 can be more readily seen in FIG. 10 where a battery compartment is adapted to receive a battery 11. A receptacle 54 for a plug of battery charger 47 is positioned at an end segment 54. The battery compartment is adjacent the motor area 8 followed by the fan 7 and an exhaust outlet 57. Forward of the fan 7 is a compartment 58 (FIG. 11) for receiving and storing the telescoping tube shaped duct members. Although the tube shaped duct members are shown to have an essentially circular, cross sectional configuration, they may also assume other suitable cross sectional shapes, such as rectangular or oval. Grooves 59, as best seen in a cross section view of FIG. 16, are provided to guide the duct members in their sliding telescopic motion within each other and are turned to lock in position. The external and internal dimensions of the duct members are provided to both enable sliding engagement and to provide an air-tight fit without the use of sealing gaskets or O-rings. Duct member 53 can comprise a single body or it may be formed from a plurality of bodies. Generally, it is formed of two bodies which enable the charger receptacle, batteries, electrical connections, motor and fan to be placed therein. The bodies are then fastened together by screws, belts or snaps. An extension tube or cartridge may have snaps 60 (FIG. 11), detents or spring loaded leads that lock in the grooves when twisted to retain the tube in the desired degree of retraction or extension.

FIG. 12 illustrates the duct member 55 with snaps or detents 60 with respective tapered ends 61 and 62. The taper of ends 61 and 62 are sloped at an inverse angle to enable the duct members 55 and 56 to be fitted one within the other as shown by the expanded view of FIG. 12. Likewise FIG. 11 shows the first duct member and second duct member in an expanded view. The steps 63 located within the first duct member limit inward movement of the extension tube. Recessed ring 36 receives snaps 60 to retain the first extension in its fully extended position.

FIG. 13 illustrates a disposable duct member 56 with outlet and inlet tapered ends 61 and 62, respectively and with the cartridge formed by using the tube body as a compartment of the cartridge. The tube has tapered ends 61 and 62 to facilitate engagement with a preceding telescoping duct member and to receive the nozzle 15, respectively. In this embodiment the nozzle 15 fits inside the tube 56 and the nozzle snap or detent engages a recessed groove 36 to provide a rigid insect catcher. Alternatively, a detent hole may be provided to receive and engage the snap 36. The cartridge has a coating of adhesive 40, a tension valve 65, as in FIG. 4, forming an inlet closure member and a filter 66 for removing entrained insects from the air stream.

Figure 14:
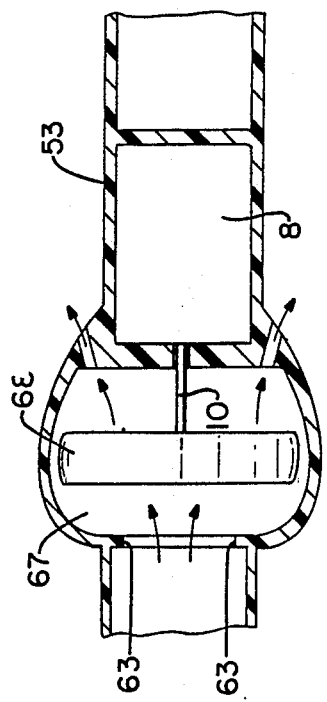
FIG. 14 is a fragmentary, elongated, crosssectional view of an embodiment of the device of FIG. 7 and 8 and illustrating an enlarged fan section for a motor driver fan.
Figure 15:
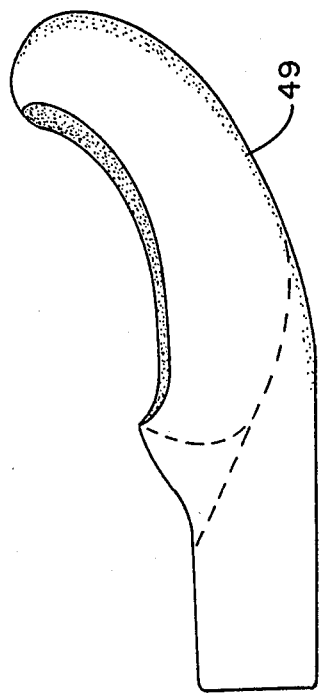
FIG. 15 is a side elevational view of a nozzle used with the device of this invention and having a scoop shaped configuration useful for catching an insect in flight.

In FIG. 14 there is illustrated a fragmentary view of the motor compartment with an enlarged fan section 67 housing a fan with relatively long blades 68 within a gently sloping housing surface segment 69 interconnecting the motor area and the duct storage area 58. The housing includes an outlet 71 for exhausting the air stream from the housing. While the tubular duct members may be formed of an optically opaque polymer plastic material, it is desirable that the disposable cartridge be formed of a transparent or partially transparent material to readily indicate when the cartridge need to be replaced. In one embodiment the cartridge is extruded from transparent plastic. The insect adhesive is then compounded with a pigment and the interior of the cartridge is then coated with the pigmented adhesive. A segment of the interior surface remains free of the adhesive to provide a window 70 for viewing the interior for collected insects.

There has thus been described an improved pest collection and disposal device. An improved cartridge for use with the device is also described. The device is advantageous in that it facilitates capturing pests from both accessible locations and from inaccessible locations with an expandable array of telescoping duct members. The expandable array can be retracted for storage. The improved cartridge disclosed herein automatically captures and restrains insects entrained in an air stream and facilitates the sanitary disposal of insects thus entrapped. The cartridge may be a separate body positioned in the air stream at a cavity of the housing, it may alternatively be positioned in a duct member including a telescoping duct member and it may alternatively be formed with a disposable duct member as a compartment of the cartridge. The device described in advantageously provided with a housing having a handle grip and it may be formed as a wand shaped device with telescoping duct members.

Although there has been described herein particular embodiments of the invention, it will be apparent to those skilled in the art that variations may be made thereto without departing from the spirit of the invention and the scope of the appended claims.

What is claimed is:

1. An improved pest collection device consisting of an expandible and retractable array of interconnected, hollow duct members, at least one of said a duct members is adapted for sliding telescopic motion, said duct members positioned at least partly in an adjacent member to vary the length of the array, at least one of said duct members having an electric power supply compartment, a motor fan compartment, and an insect collection compartment wherein said collection compartment has a disposable-replaceable cartridge means which comprises: an elongated hollow body having inlet and outlet ends, a flexible closure member positioned at said inlet end and is deflectable to provide an entrance to the hollow body when an air stream flows therein, and a filter means positioned adjacent said outlet end of said hollow body through which said air stream flows for removing a pest entrained in said air stream;

whereby, the disposable cartridge enables pests to be collected and disposed of without presenting an unsanitary, or unsightly condition, as well as inhibiting escape of insects from within the cartridge during disposal, each of said compartments arranged to enable air to flow into said device at an inlet of said insect collection compartment and flow to said motor fan compartment and to be exhausted from said array.

2. The device of claim 1 wherein at least one of said duct members is non-tubular in shape.

3. The device of claim 1 wherein at least one duct member is adapted for telescopic retraction into the interior of an adjacent duct member for storage and for extension from said adjecent duct member to increase the length of the device.

4. The device of claim 1 wherein a duct member is formed of a transparent polymer plastic having said filter means and closure member positioned therein.

5. The device of claim 4 wherein said transparent duct member includes an interior surface which is coated inside with a pigmented adhesive.

6. The device claim 5 wherein said transparent duct member includes an uncoated segment.

* * * * *